(12) United States Patent
Bennah et al.

(10) Patent No.: US 9,367,380 B2
(45) Date of Patent: *Jun. 14, 2016

(54) DYNAMICALLY ALTERING ERROR LOGGING ACTIVITIES IN A COMPUTING SYSTEM

(71) Applicant: LENOVO ENTERPRISE SOLUTIONS (SINGAPORE) PTE. LTD., Singapore (SG)

(72) Inventors: Albert D. Bennah, Cary, NC (US); Surendra Kodali, Hyderabad (IN); Robert M. Morgan, Durham, NC (US); Keyur Patel, Poughkeepsie, NY (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 130 days.

This patent is subject to a terminal disclaimer.

(21) Appl. No.: 13/849,708

(22) Filed: Mar. 25, 2013

(65) Prior Publication Data

US 2014/0289573 A1  Sep. 25, 2014

Related U.S. Application Data

(63) Continuation of application No. 13/848,770, filed on Mar. 22, 2013.

(51) Int. Cl.
*G06F 11/00* (2006.01)
*G06F 11/07* (2006.01)

(52) U.S. Cl.
CPC ........ *G06F 11/0769* (2013.01); *G06F 11/0736* (2013.01)

(58) Field of Classification Search
USPC ................................................ 714/48, 57, 25
See application file for complete search history.

(56) References Cited

U.S. PATENT DOCUMENTS

| | | | |
|---|---|---|---|
| 7,210,685 B2 | 5/2007 | Cheng | |
| 7,225,367 B2 * | 5/2007 | Hashem et al. | 714/48 |
| 7,559,055 B2 | 7/2009 | Yang et al. | |
| 2005/0015668 A1 * | 1/2005 | Doyle et al. | 714/25 |

(Continued)

FOREIGN PATENT DOCUMENTS

| | | |
|---|---|---|
| JP | 2000250778 A | 9/2000 |
| JP | 2008140162 A | 6/2008 |

OTHER PUBLICATIONS

Zamfir et al., "Execution Synthesis: A Technique for Automated Software Debugging", EuroSys '10 Proceedings of the 5th European Conference on Computer Systems, Apr. 2010, pp. 321-334, ACM New York.

(Continued)

*Primary Examiner* — Sarai Butler
(74) *Attorney, Agent, or Firm* — Edward J. Lenart; Katherine S. Brown; Kennedy Lenart Spraggins LLP

(57) ABSTRACT

Dynamically altering error logging activities in a computing system, including: receiving, by an error logging manager, historical error resolution data; identifying, by the error logging manager in dependence upon the historical error resolution data, a plurality of computing components associated with each error contained in the historical error resolution data; and associating, by the error logging manager in a related component repository, an identification of each of the plurality of computing components associated with each error and an identification of the error.

18 Claims, 4 Drawing Sheets

(56) References Cited

U.S. PATENT DOCUMENTS

| | | |
|---|---|---|
| 2008/0134148 A1 | 6/2008 | Clark |
| 2009/0031171 A1 | 1/2009 | Fashchik et al. |
| 2009/0125580 A1* | 5/2009 | Canning et al. ............... 709/203 |
| 2010/0088541 A1* | 4/2010 | Tanaka ................ G06F 11/0781 714/6.12 |
| 2010/0313073 A1* | 12/2010 | Leeb et al. ...................... 714/37 |
| 2011/0154117 A1 | 6/2011 | Danielson et al. |
| 2013/0086429 A1* | 4/2013 | Ng ............................... 714/38.1 |

OTHER PUBLICATIONS

The University of Texas at El Paso, "Logic Analyzer", Microprocessors I, (EE3376) course details, Spring 2008, www.ece.utep.edu (online) [accessed Jun. 12, 2012], 4 pp., URL: http://www.ece.utep.edu/courses/web3376/Logic Analyzer.html.

Wikipedia, "Logic Analyzer", en.wikipedia.org (online), May 28, 2012 [accessed Jun. 12, 2012], 1 pp., URL: http://en.wikipedia.org/wiki/Logic_analyzer.

* cited by examiner

US 9,367,380 B2

DYNAMICALLY ALTERING ERROR LOGGING ACTIVITIES IN A COMPUTING SYSTEM

CROSS-REFERENCE TO RELATED APPLICATION

This application is a continuation application of and claims priority from U.S. patent application Ser. No. 13/848,770, filed on Mar. 22, 2013.

BACKGROUND OF THE INVENTION

1. Field of the Invention

The field of the invention is data processing, or, more specifically, methods, apparatus, and products for dynamically altering error logging activities in a computing system.

2. Description of Related Art

Modern computing systems include a plurality of components, software and hardware, that can operate in unexpected ways at times. Such components may generate errors that can be serviced by other computing components. Many computing systems generate error logs and carry out other forms of event logging to assist a system administrator in the process of resolving an error. Logging errors and events can consume large amounts of memory and processing power, such that maintaining a robust logging policy may not be desirable in view of the large amounts of system resources that are consumed. Maintaining a less robust logging policy, however, also has drawbacks as necessary information for analyzing an error may not be retained.

SUMMARY OF THE INVENTION

Methods, apparatuses, and products for dynamically altering error logging activities in a computing system, including: receiving, by an error logging manager, historical error resolution data; identifying, by the error logging manager in dependence upon the historical error resolution data, a plurality of computing components associated with each error contained in the historical error resolution data; and associating, by the error logging manager in a related component repository, an identification of each of the plurality of computing components associated with each error and an identification of the error.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
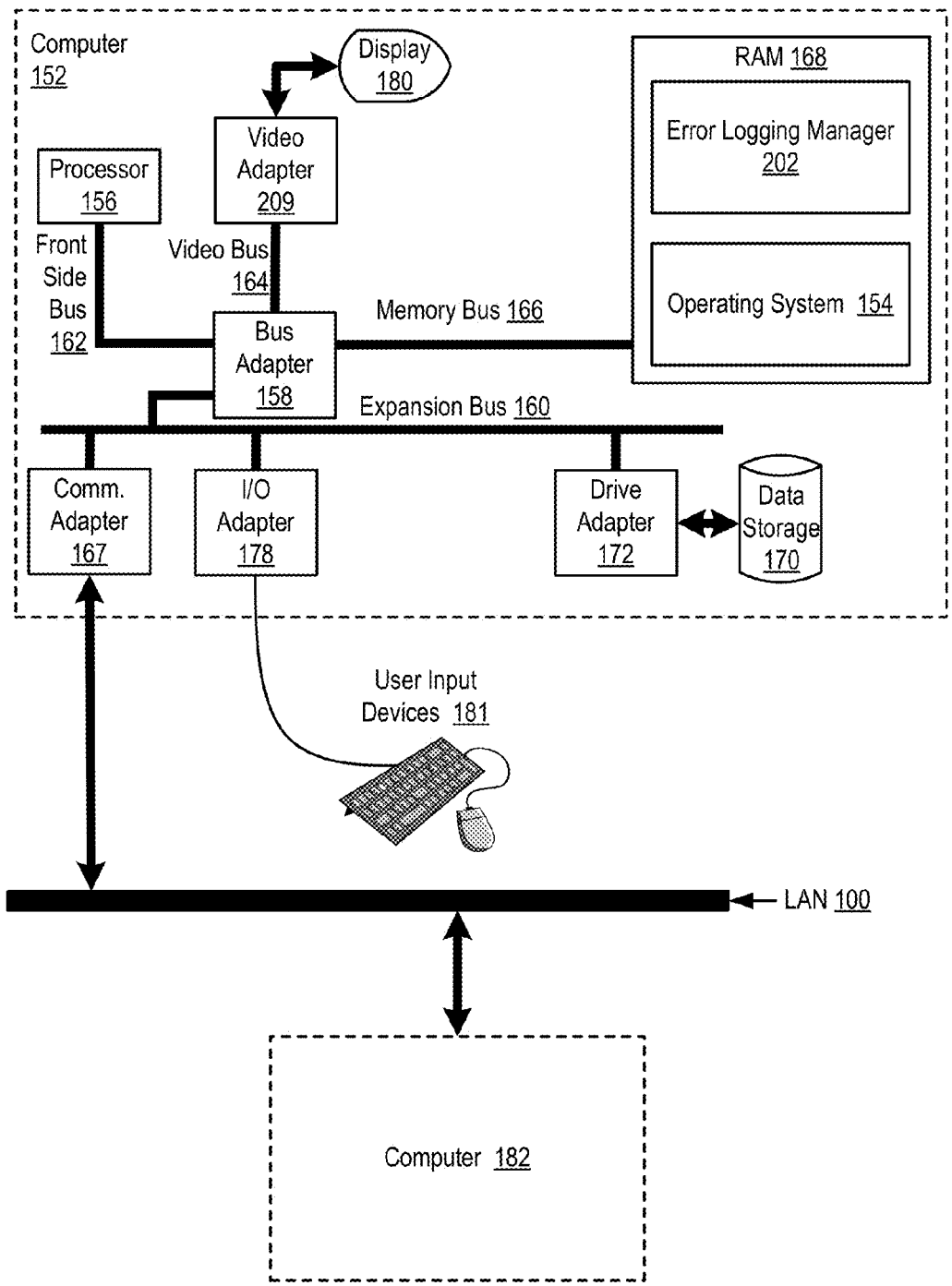
FIG. 1 sets forth a block diagram of automated computing machinery comprising an example computer useful in dynamically altering error logging activities in a computing system according to embodiments of the present invention.

Example methods, apparatus, and products for dynamically altering error logging activities in a computing system in accordance with the present invention are described with reference to the accompanying drawings, beginning with FIG. 1. FIG. 1 sets forth a block diagram of automated computing machinery comprising an example computer (152) useful in dynamically altering error logging activities in a computing system according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an error logging manager (202), a module of computer program instructions for dynamically altering error logging activities in a computing system according to embodiments of the present invention. The error logging manager (202) of FIG. 1 may be embodied as computer program instructions executing on computer hardware. The error logging manager (202) of FIG. 1 may include special purpose computer program instructions for associating various errors that occur in the computing system with various computing components in the computing system, determining whether the level of error logging activity that the computing system performs is sufficient, and dynamically altering error logging activities in a computing system.

In the example of FIG. 1, the error logging manager (202) can dynamically alter error logging activities in a computing system by receiving historical error resolution data. The historical error resolution data includes information describing one or more errors that occurred in the computing system, the computing components that were associated with the error, an identification of corrective action that was taken to fix the error, and so on. The historical error resolution data may be embodied, for example, as a structured document such as an extensible markup language ('XML') document that associates one or more variables with values. The historical error resolution data may be consumed and processed by the error logging manager (202) such that the error logging manager (202) can learn more about the errors that occur in the computing system, including how to take corrective action in response to the error and how to log the activities of computing components in the computing system that are associated with the error.

In the example of FIG. 1, the error logging manager (202) can further dynamically alter error logging activities in a computing system by identifying, in dependence upon the historical error resolution data, a plurality of computing components associated with each error contained in the historical error resolution data. Identifying a plurality of computing components associated with each error contained in the historical error resolution data may be carried out by inspecting each error entry in the historical error resolution data. In such an example, each error entry in the historical error resolution data can include an identification of each computing component that is associated with the error.

In the example of FIG. 1, the error logging manager (202) can further dynamically alter error logging activities in a computing system by associating, in a related component repository, an identification of each of the plurality of computing components associated with each error and an identification of the error. The related component repository may be embodied, for example, as a table, database, or other appropriate data structure that includes an entry for a plurality of errors that have been generated at some point by the computing system. In such an example, each entry in the related component repository can include, for example, an identification of an error, an identification of computing components associated with the error, an identification of an error correction module such as a script to execute to repair an error, and so on. Associating an identification of each of the plurality of computing components associated with each error and an identification of the error in a related component repository may therefore be carried out, for example, by searching the related component repository for an entry for the error and creating an entry for the error if one does not already exist.

Also stored in RAM (168) is an operating system (154). Operating systems useful dynamically altering error logging activities in a computing system according to embodiments of the present invention include UNIX™, Linux™, Microsoft XP™, AIX™, IBM's i5/OS™, and others as will occur to those of skill in the art. The operating system (154) and the error logging manager (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for dynamically altering error logging activities in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically altering error logging activities in a computing system according to embodiments of the present invention include modems for wired dial-up communications, Ethernet (IEEE 802.3) adapters for wired data communications network communications, and 802.11 adapters for wireless data communications network communications.

Figure 2:
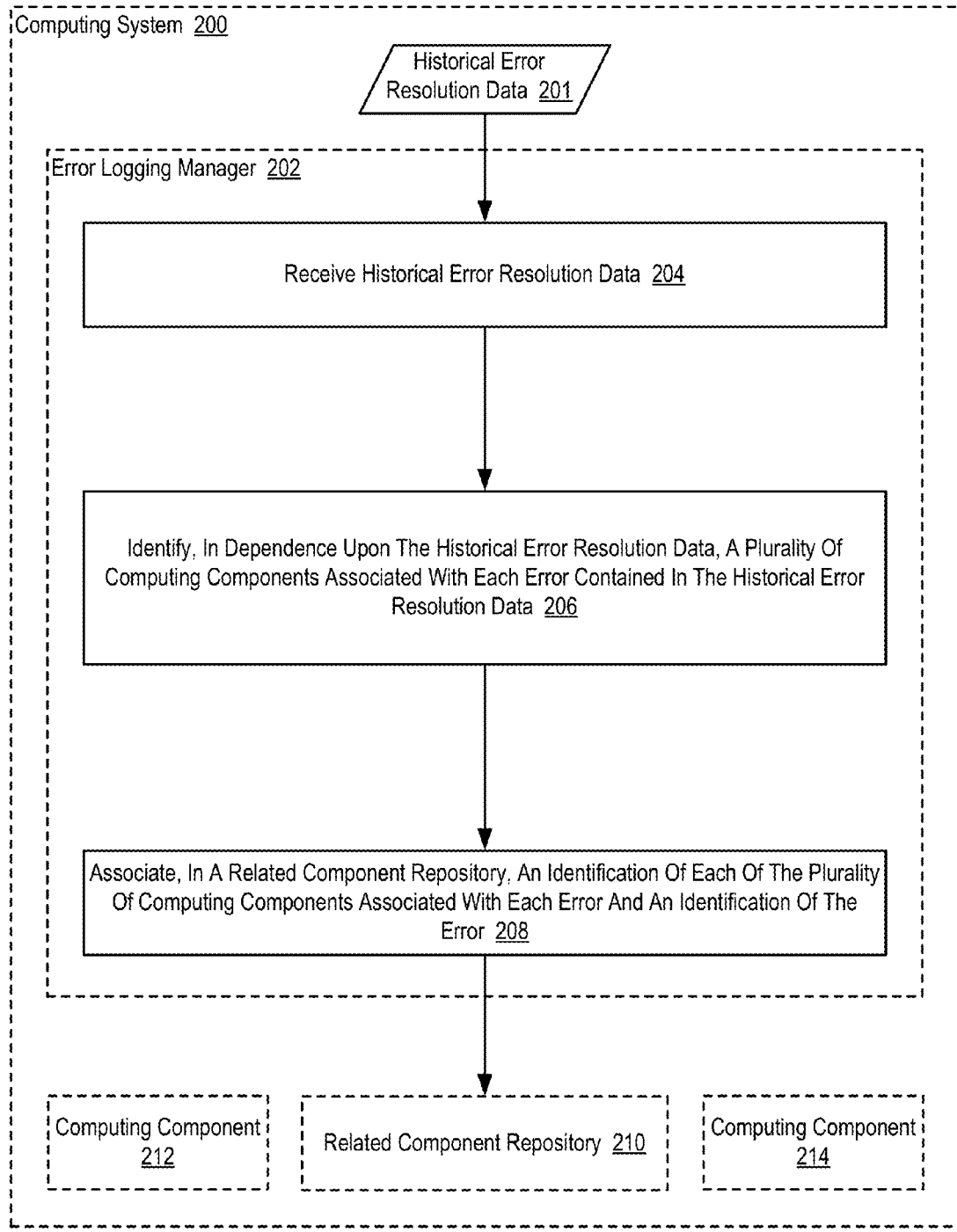
FIG. 2 sets forth a flow chart illustrating an example method for dynamically altering error logging activities in a computing system according to embodiments of the present invention.

For further explanation, FIG. 2 sets forth a flow chart illustrating an example method for dynamically altering error logging activities in a computing system (200) according to embodiments of the present invention. The example method of FIG. 2 is carried out by an error logging manager (202). In the example method of FIG. 2 the error logging manager (202) may be embodied as a module of computer program instructions executing on computer hardware. The error logging manager (202) of FIG. 2 may include special purpose computer program instructions for associating various errors that occur in the computing system (200) with various computing components in the computing system, determining whether the level of error logging activity that the computing system (200) performs is sufficient, and dynamically altering error logging activities in a computing system (200).

The example method of FIG. 2 includes receiving (204), by the error logging manager (202), historical error resolution data (201). In the example method of FIG. 2, the historical error resolution data (201) includes information describing one or more errors that occurred in the computing system (200), the computing components (212, 214) that were associated with the error, an identification of corrective action that was taken to fix the error, and so on. In the example method of FIG. 2, the historical error resolution data (201) may be embodied, for example, as a structured document such as an XML document that associates one or more variables with values. The historical error resolution data (201) may be consumed and processed by the error logging manager (202) such that the error logging manager (202) can learn more about the errors that occur in the computing system (200), including how to take corrective action in response to the error and how to log the activities of computing components (212, 214) in the computing system (200) that are associated with the error.

Consider an example in which the computing system (200) includes a plurality of blade servers, each of which executes one or more virtual machines. In such an example, an inventory collection process can be configured to periodically capture an image of each virtual machine executing on each of the blade servers. If the inventory collection process is not able to capture an image of each virtual machine executing on each of the blade servers, however, an error message with an error code will be generated. In such an example, the inventory collection process may not be able to capture an image of a particular virtual machine executing on a particular blade servers because a storage device that stores information associated with the particular virtual machine has been configured by the manufacturer with an invalid UUID that identifies the storage device. As such, when the inventory collection process attempts to access the storage device, the inventory collection process is not able to access the storage device using the invalid UUID. The storage device is therefore a computing component in the computing system that is associated with the error.

In addition to the storage device being designated as a computing component in the computing system that is associated with the error, the failure to periodically capture an image of each virtual machine executing on each of the blade servers may have a negative impact on a virtual machine control component in the computing system (200). For example, the virtual machine control component may require an accurate image of each virtual machine executing on each of the blade servers to function properly. The virtual machine control component may therefore also be a computing component in the computing system (200) that is associated with the error because the occurrence of the error can result in the virtual machine control component operating improperly.

In the process of responding to such an error, a system administrator may create documentation describing the error, the computing components in the computing system (200) that is associated with the error, information describing how the computing components in the computing system (200) are associated with the error (e.g., a component causes the error, a component is negatively impacted by the error), information describing a tool used to correct the error, and so on. In such an example, such documentation may be converted into a machine readable format such as a structured document that is received (204) by the error logging manager (202) as historical error resolution data (201).

The example method of FIG. 2 also includes identifying (206), by the error logging manager (202) in dependence upon the historical error resolution data (201), a plurality of computing components (212, 214) associated with each error contained in the historical error resolution data (201). In the example method of FIG. 2, identifying (206) a plurality of computing components (212, 214) associated with each error contained in the historical error resolution data (201) may be carried out by inspecting each error entry in the historical error resolution data (201). In such an example, each error entry in the historical error resolution data (201) can include an identification of each computing component (212, 214) that is associated with the error.

The example method of FIG. 2 also includes associating (208), by the error logging manager (202) in a related component repository (210), an identification of each of the plurality of computing components (212, 214) associated with each error and an identification of the error. The related component repository (210) of FIG. 2 may be embodied, for example, as a table, database, or other appropriate data structure that includes an entry for a plurality of errors that have been generated at some point by the computing system (200). In such an example, each entry in the related component repository (210) can include, for example, an identification of an error, an identification of computing components (212, 214) associated with the error, an identification of an error correction module such as a script to execute to repair an error, and so on. In the example method of FIG. 2, associating (208) an identification of each of the plurality of computing components (212, 214) associated with each error and an identification of the error in a related component repository (210) may therefore be carried out, for example, by searching the related component repository (210) for an entry for the error and creating an entry for the error if one does not already exist. Consider the example related component repository (210) below:

TABLE 1

Related Component Repository

| Error Code | Associated Components | Error Correction Module | Preferred Logging Level | Historical Error Resolution Data File | System Admin Doc |
|---|---|---|---|---|---|
| A123 | Inventory Collector, Main | A123.exe | 3, 3 | File66.xml | doc1 |

TABLE 1-continued

Related Component Repository

| Error Code | Associated Components | Error Correction Module | Preferred Logging Level | Historical Error Resolution Data File | System Admin Doc |
|---|---|---|---|---|---|
| B234 | Memory Hypervisor, CPU, Network Adapter | B234.exe | 5, 1, 3 | File31.xml | doc8 |
| C345 | CPU, Main Memory | C345.exe | 9, 8 | File12.xml | doc58 |
| D432 | Operating System, Memory Defragmenter | D432.exe | 2, 9 | File159.xml | doc42 |

The example related component repository (210) illustrated in Table 1 includes entries for four errors. Each entry includes an error code that identifies the type of error that occurred. Each entry also includes a list of the computing components that are associated with the error. Each entry also includes an identification of an error correction module to be executed in order to correct the error. Each entry also includes the preferred logging level for each of the computing components that are associated with the error. The preferred logging level represents the level of granularity with which to log the activities of each of the computing components that are associated with the error and will be discussed in greater detail with respect to FIG. 4. Each entry also includes a file name for historical error resolution file that was used to create the entry, as well as an identification of a document generated by a system administrator that was used to create the historical error resolution file.

Figure 3:
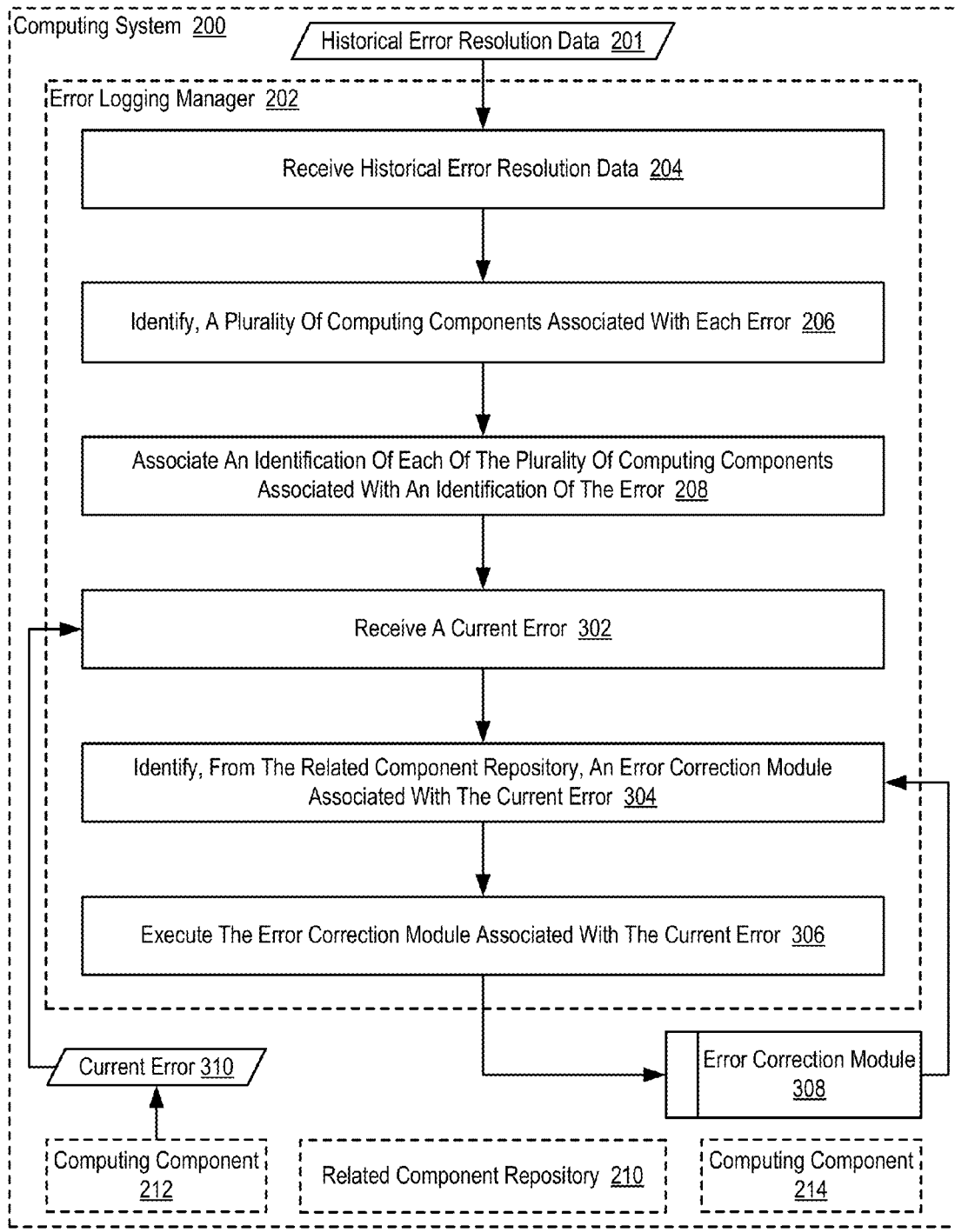
FIG. 3 sets forth a flow chart illustrating an additional example method for dynamically altering error logging activities in a computing system according to embodiments of the present invention.

For further explanation, FIG. 3 sets forth a flow chart illustrating an additional example method for dynamically altering error logging activities in a computing system (200) according to embodiments of the present invention. The example method of FIG. 3 is similar to the example method of FIG. 2, as it also includes receiving (204) historical error resolution data (201), identifying (206) a plurality of computing components (212, 214) associated with each error contained in the historical error resolution data (201), and associating (208) in a related component repository (210) an identification of each of the plurality of computing components (212, 214) associated with each error and an identification of the error.

The example method of FIG. 3 also includes receiving (302), by the error logging manager (202), a current error (310). In the example method of FIG. 3, the current error (310) represents the occurrence of some error condition in the computing system (200) for which corrective action has not been taken. In the example method of FIG. 3, the current error (310) may be received (302), for example, from a computing component (212) that generated the current error (310).

The example method of FIG. 3 also includes identifying (304), by the error logging manager (202) from the related component repository (210), an error correction module (308) associated with the current error (310). In the example method of FIG. 3, entries in the related component repository (210) may include an identification of an error, an identification of computing components (212, 214) associated with the error, an identification of an error correction module such as a script to execute to repair an error, and so on. In such an example, an error code that identifies the nature of the current error (310) may be extracted from metadata included in the current error (310). The error code may be used to search the related component repository (210) to identify an entry for an error of the same type as the current error (310). In such an example, when the error logging manager (202) finds an entry in the related component repository (210) for an error of the same type as the current error (310), the error logging manager (202) may extract the identification of an error correction module (308) associated with the entry in the related component repository (210) for an error that is of the same type as the current error (310).

The example method of FIG. 3 also includes executing (306), by the error logging manager (202), the error correction module (208) associated with the current error (310). In the example method of FIG. 3, executing (306) the error correction module (208) associated with the current error (310) may be carried out by the error logging manager (202) initiating a call to the error correction module (208). In such an example, the error logging manager (202) may pass information extracted from the current error (310) to the error correction module (208) as input parameters. In the example method of FIG. 3, the error correction module (208) may be embodied as a module of computer program instructions executing on computer hardware. The error correction module (208) may include computer program instructions for initiating actions that can resolve the condition that resulted in the generation of the current error (310).

Consider the example described above in which an inventory collection process could not capture an image of a virtual machine because a storage device that stores information associated with the particular virtual machine has been configured by the manufacturer with an invalid UUID that identifies the storage device. In such an example, the error correction module (208) may include computer program instructions for generating a temporary UUID for each storage unit before the inventory collection process is executed again. In such an example, the error correction module (208) may generate a temporary UUID for the storage device with the invalid UUID and restart the inventory collection process.

Figure 4:
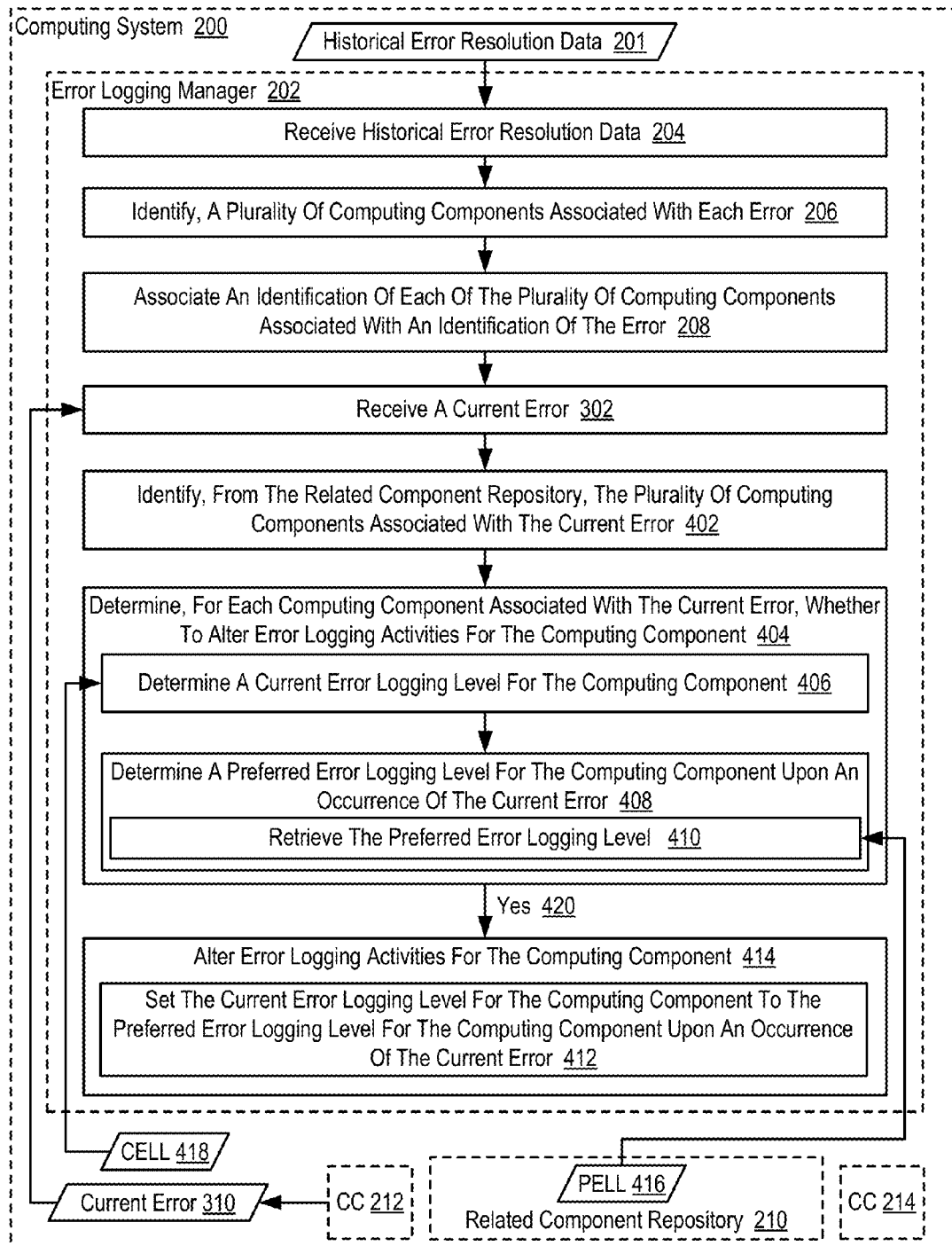
FIG. 4 sets forth a flow chart illustrating an additional example method for dynamically altering error logging activities in a computing system according to embodiments of the present invention.

For further explanation, FIG. 4 sets forth a flow chart illustrating an additional example method for dynamically altering error logging activities in a computing system (200) according to embodiments of the present invention. The example method of FIG. 4 is similar to the example method of FIG. 2, as it also includes receiving (204) historical error resolution data (201), identifying (206) a plurality of computing components (212, 214) associated with each error contained in the historical error resolution data (201), and associating (208) in a related component repository (210) an identification of each of the plurality of computing components (212, 214) associated with each error and an identification of the error.

The example method of FIG. 4 also includes receiving (302), by the error logging manager (202), a current error (310). In the example method of FIG. 4, the current error (310) represents the occurrence of some error condition in the computing system (200) for which corrective action has not been taken. The current error (310) of FIG. 4 may be received (302), for example, from a computing component (212) that generated the current error (310).

The example method of FIG. 4 also includes identifying (402), by the error logging manager (202) from the related component repository (210), the plurality of computing components (212, 214) that are associated with the current error (310). In the example method of FIG. 4, each entry in the related component repository (210) may include an identification of the computing components (212, 214) in the computing system (200) that are associated with an error identified by an error code. In such an example, identifying (402) the plurality of computing components (212, 214) that are associated with the current error (310) may be carried out, for example, by extracting an error code from the current error (310) and searching the related component repository (210) for an entry that matches the error code from the current error (310). Upon identifying an entry in the related component repository (210) that matches the error code from the current error (310), the error logging manager (202) may retrieve the identification of the computing components (212, 214) in the computing system (200) that are associated with an error identified by the error code.

The example method of FIG. 4 also includes determining (404), by the error logging manager (202) for each computing component (212, 214) associated with the current error (310), whether to alter error logging activities for the computing component (212, 214). In the example method of FIG. 4, determining (404) whether to alter error logging activities for the computing component (212, 214) can include determining (406), by the error logging manager (202), a current error logging level (418) for the computing component (212, 214). In the example method of FIG. 4, an error logging level may be embodied as a numerical value used to determine the level of granularity with which logging activities occur. For example, an error logging level of '0' may indicate that nothing is logged for a particular computing component (212, 214) while an error logging level of '10' may indicate every action performed by a particular computing component (212, 214) is logged with all possible details. In the example method of FIG. 4, the current error logging level (418) may be maintained by the associated computing component (212, 214) itself, in the related component repository (210), by the error logging manager (202), at a predefined location in computer memory, and so on. In such an example, the error logging manager (202) may determine (406) the current error logging level (418) for the computing component (212, 214) by extracting such information from the appropriate source.

In the example method of FIG. 4, determining (404) whether to alter error logging activities for the computing component (212, 214) can also include determining (408), by the error logging manager (302), a preferred error logging level (416) for the computing component (212, 214) upon an occurrence of the current error (310). In the example method of FIG. 4, a preferred error logging level (416) for a particular computing component (212, 214) may represent the level of granularity at which the activities of the particular computing component (212, 214) should be logger. In such an example, when an error occurs and the particular computing component (212, 214) is associated with the error, it may be preferable to log the activities of the particular computing component (212, 214) in great detail. Alternatively, during periods at which the particular computing component (212, 214) is operating without generating errors, it may be preferable to log the activities of the particular computing component (212, 214) in less detail. In such an example, determining (408) a preferred error logging level (416) for the computing component (212, 214) upon an occurrence of the current error (310) may be carried out by extracting an error code from the current error (310) and searching the related component repository (210) for an entry that matches the error code. In such an example, the entry in the related component repository (210) that matches the error code may include information identifying the preferred error logging level (416) for each computing component (212, 214) that is associated with an error of the type that matches upon the occurrence of such an error.

In the example method of FIG. 4, the related component repository (210) can specify the preferred error logging level (416) for the each computing component (212, 214) associated with an identification of the error. As described above, the related component repository (210) may be embodied as a table, database, or other appropriate data structure that includes an entry for a plurality of errors that have been generated at some point by the computing system (200). Each entry in the related component repository (210) can include an identification of an error, an identification of computing components (212, 214) associated with the error, an identification of an error correction module such as a script to execute to repair an error, and so on. In the example method of FIG. 4, each entry in the related component repository (210) can also include preferred error logging level (416) for the each computing component (212, 214) that is associated with an identification of the error. In such an example, the preferred error logging level (416) for the each computing component (212, 214) that is associated with an identification of the error may be extracted from historical error resolution data (201).

As described above, the historical error resolution data (201) can include information describing one or more errors that occurred in the computing system (200), the computing components (212, 214) that were associated with the error, an identification of corrective action that was taken to fix the error, and so on. In such an example, the historical error resolution data (201) may be generated by a system administrator creating documentation describing how the error was resolved. Such documentation may identify the computing components in the computing system (200) that are associated with the error, information describing how the computing components in the computing system (200) are associated with the error (e.g., a component causes the error, a component is negatively impacted by the error), information describing a tool used to correct the error, and so on. In such an example, the documentation may also include information identifying the level to which activities carried out by an associated computing component should be monitored when the error occurs. Such documentation may be converted into a machine readable format such as a structured document that is received by the error logging manager (202) as historical error resolution data (201) and ultimately converted into an entry in the related component repository (210).

In the example method of FIG. 4, determining (408), by the error logging manager (302), a preferred error logging level (416) for the computing component (212, 214) upon an occurrence of the current error (310) can include retrieving (410) the preferred error logging level (416) from the related component repository (210). In such an example, retrieving (410) the preferred error logging level (416) from the related component repository (210) may be carried out by identifying an entry in the related component repository (210) that corresponds to the current error (310) and retrieving (410) the preferred error logging level (416) from such an entry.

The example method of FIG. 4 also includes altering (414), by the error logging manager (202), error logging activities for the computing component (212, 214). In the example method of FIG. 4, altering (414) error logging activities for the computing component (212, 214) is carried out in response to affirmatively (420) determining to alter error logging activities for the computing component (212, 214). In the example method of FIG. 4, altering (414) error logging activities for the computing component (212, 214) can include setting (412), by the error logging manager (202), the current error logging level (418) for the computing component (212, 214) to the preferred error logging level (416) for the computing component (212, 214) upon an occurrence of the current error (310).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by computer program instruction on a computing device, receiving an identification of an error;
examining a repository to identify a plurality of computing components associated with the identification of the error, wherein the repository comprises an entry including the identification of the error, an identification of computer components associated with the error, and a preferred error logging level for the computer components;
determining for each computing component associated with the identification of the error, whether to alter error logging activities for the computing component; and
responsive to determining to alter error logging activities for the computing component, altering error logging activities for the computing component.

2. The method of claim 1 further comprising:
identifying from the repository, an error correction module associated with the error; and
executing the error correction module associated with the error.

3. The method of claim 1 wherein:
determining for each computing component associated with the error, whether to alter error logging activities for the computing component further comprises:
determining a current error logging level for the computing component;
determining the preferred error logging level for the computing component upon an occurrence of the error; and
altering error logging activities for the computing component further comprises setting the current error logging level for the computing component to the preferred error logging level for the computing component upon an occurrence of the error.

4. The method of claim 3 wherein:
the repository specifies the preferred error logging level for the each computing component associated with an identification of the error; and
determining the preferred error logging level for the computing component upon an occurrence of the error includes retrieving the preferred error logging level from the repository.

5. The method of claim 1 further comprising:
receiving historical error resolution data, wherein the historical error resolution data includes information describing how previously encountered errors have been previously resolved;
identifying in dependence upon the historical error resolution data, a plurality of computing components associated with each error contained in the historical error resolution data; and
associating in a repository, an identification of each of the plurality of computing components associated with each error and an identification of the error.

6. The method of claim 5 wherein the historical error resolution data is a structured document.

7. An apparatus comprising a computer processor a computer memory operatively coupled to the computer processor, the computer memory having disposed within it computer program instructions that, when executed by the computer processor, cause the apparatus to carry out the steps of:
receiving an identification of an error;
examining a repository to identify a plurality of computing components associated with the identification of the error, wherein the repository comprises an entry including the identification of the error, an identification of computer components associated with the error, and a preferred error logging level for the computer components;
determining for each computing component associated with the identification of the error, whether to alter error logging activities for the computing component; and responsive to determining to alter error logging activities for the computing component, altering error logging activities for the computing component.

8. The apparatus of claim 7 further comprising computer program instructions that, when executed by the computer processor, cause the apparatus to carry out the steps of:
identifying from the repository, an error correction module associated with the error; and
executing the error correction module associated with the error.

9. The apparatus of claim 7 wherein:
determining for each computing component associated with the error, whether to alter error logging activities for the computing component further comprises:
determining a current error logging level for the computing component;
determining the preferred error logging level for the computing component upon an occurrence of the error; and
altering error logging activities for the computing component further comprises setting the current error logging level for the computing component to the preferred error logging level for the computing component upon an occurrence of the error.

10. The apparatus of claim 9 wherein:
the repository specifies the preferred error logging level for the each computing component associated with an identification of the error; and
determining the preferred error logging level for the computing component upon an occurrence of the error includes retrieving the preferred error logging level from the repository.

11. The apparatus of claim 7 further comprising computer program instructions that, when executed by the computer processor, cause the apparatus to carry out the steps of:
receiving historical error resolution data, wherein the historical error resolution data includes information describing how previously encountered errors have been previously resolved;
identifying in dependence upon the historical error resolution data, a plurality of computing components associated with each error contained in the historical error resolution data; and
associating in a repository, an identification of each of the plurality of computing components associated with each error and an identification of the error.

12. The apparatus of claim 11 wherein the historical error resolution data is a structured document.

13. A computer program product including a non-transitory computer readable medium, the computer program product comprising computer program instructions that, when executed, cause a computer to carry out the steps of:
by computer program instruction on a computing device, receiving an identification of an error;
examining a repository to identify a plurality of computing components associated with the identification of the error, wherein the repository comprises an entry including the identification of the error, an identification of computer components associated with the error, and a preferred error logging level for the computer components;
determining for each computing component associated with the identification of the error, whether to alter error logging activities for the computing component; and
responsive to determining to alter error logging activities for the computing component, altering error logging activities for the computing component.

14. The computer program product of claim 13 further comprising computer program instructions that, when executed, cause the computer to carry out the steps of:
identifying from the repository, an error correction module associated with the error; and
executing the error correction module associated with the error.

15. The computer program product of claim 13 wherein:
determining for each computing component associated with the error, whether to alter error logging activities for the computing component further comprises:
determining a current error logging level for the computing component;
determining the preferred error logging level for the computing component upon an occurrence of the error; and
altering error logging activities for the computing component further comprises setting the current error logging level for the computing component to the preferred error logging level for the computing component upon an occurrence of the error.

16. The computer program product of claim 15 wherein:
the repository specifies the preferred error logging level for the each computing component associated with an identification of the error; and
determining the preferred error logging level for the computing component upon an occurrence of the error includes retrieving the preferred error logging level from the repository.

17. The computer program product of claim 13 further comprising computer program instructions that, when executed, cause the computer to carry out the steps of:
receiving historical error resolution data, wherein the historical error resolution data includes information describing how previously encountered errors have been previously resolved;
identifying in dependence upon the historical error resolution data, a plurality of computing components associated with each error contained in the historical error resolution data; and
associating in a repository, an identification of each of the plurality of computing components associated with each error and an identification of the error.

18. The computer program product of claim 17 wherein the historical error resolution data is a structured document.

* * * * *